US006962618B2

(12) United States Patent
Gaus et al.

(10) Patent No.: US 6,962,618 B2
(45) Date of Patent: Nov. 8, 2005

(54) DEVICE FOR SEPARATING AIR FROM FLOTATION FOAM

(75) Inventors: Gerhard Gaus, Wolpertswende (DE); Harald Hess, Grünkraut (DE); Herbert Britz, Weingarten (DE)

(73) Assignee: Voith Paper Patent GmbH, Heidenheim (DE)

( * ) Notice: Subject to any disclaimer, the term of this patent is extended or adjusted under 35 U.S.C. 154(b) by 132 days.

(21) Appl. No.: 10/392,852

(22) Filed: Mar. 21, 2003

(65) Prior Publication Data

US 2003/0183081 A1    Oct. 2, 2003

(30) Foreign Application Priority Data

Mar. 30, 2002  (DE)  .................................. 102 14 403

(51) Int. Cl.⁷ ............................................ B01D 19/02

(52) U.S. Cl. ...................... 95/242; 95/260; 95/261; 96/177; 96/217; 366/305; 366/307; 209/170

(58) Field of Search ........................ 95/242, 261, 262, 95/260; 96/177, 217; 209/170, 168; 162/4; 366/305, 307; 210/221.2, 718, 703; 222/333, 222/334; 454/341

(56) References Cited

U.S. PATENT DOCUMENTS

| | | | | |
|---|---|---|---|---|
| 2,065,096 A | * | 12/1936 | Riegler | 222/229 |
| 2,908,652 A | * | 10/1959 | Forrester | 95/242 |
| 2,950,171 A | * | 8/1960 | Macq | 423/320 |
| 3,638,919 A | * | 2/1972 | Phipps | 366/262 |
| 4,310,437 A | * | 1/1982 | Schreiber | 96/177 |
| 5,094,674 A | * | 3/1992 | Schweiss et al. | 96/177 |
| 5,720,661 A | * | 2/1998 | Yoshizawa et al. | 454/341 |
| 5,792,246 A | * | 8/1998 | Nishiguchi | 96/177 |

FOREIGN PATENT DOCUMENTS

| | | |
|---|---|---|
| DE | 3519374 | 1/1987 |
| DE | 4009042 | 9/1991 |

* cited by examiner

*Primary Examiner*—Duane Smith
*Assistant Examiner*—Douglas J. Theisen
(74) *Attorney, Agent, or Firm*—Greenblum & Bernstein P.L.C.

(57) ABSTRACT

Device and process for the removal of air from flotation foam formed during the flotation of a paper-fiber-containing suspension. The device includes a driven rotor that includes a shaft and at least one rotor blade positioned on the shaft, and a non-rotating wall arranged to surround the rotor in a region of the rotor blade by a non-rotating wall. The instant abstract is neither intended to define the invention disclosed in this specification nor intended to limit the scope of the invention in any way.

33 Claims, 2 Drawing Sheets

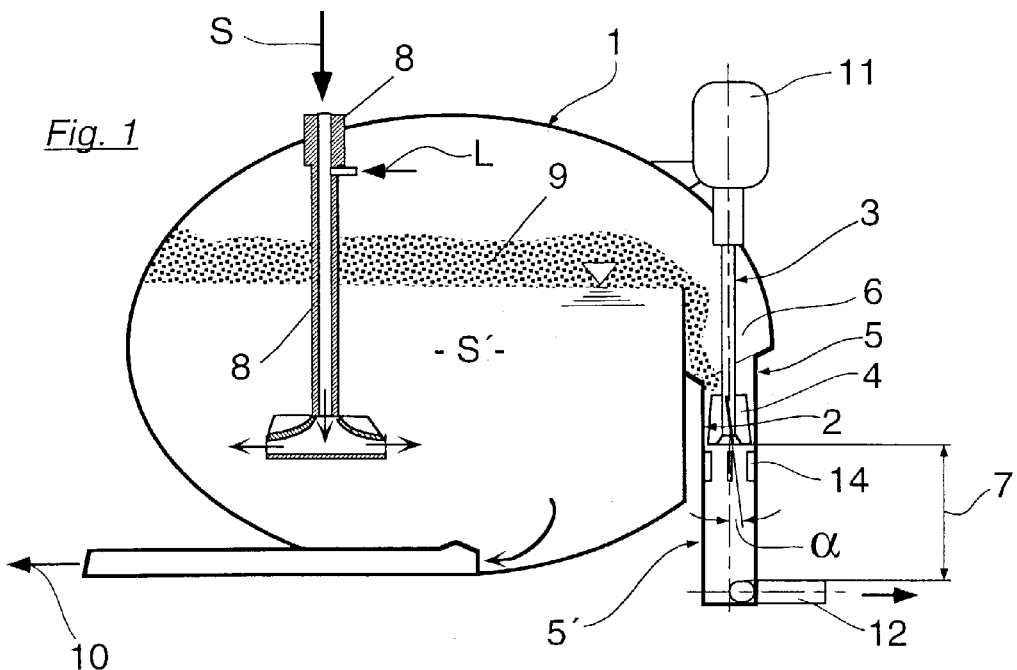
*Fig. 1*
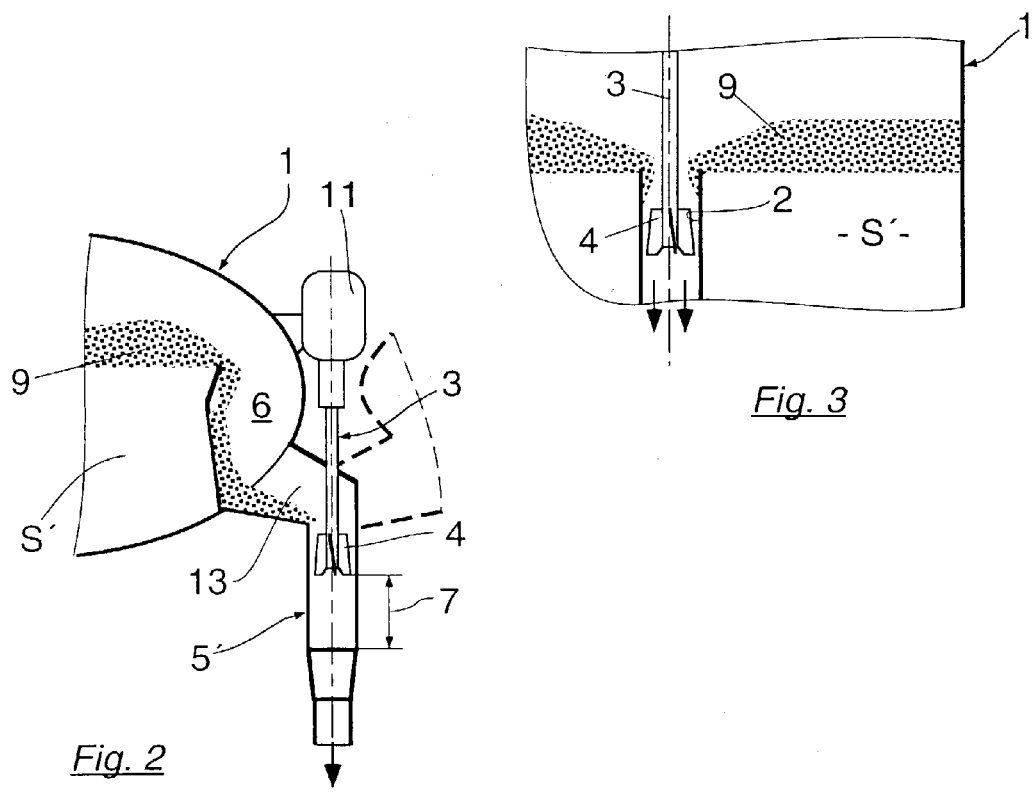
*Fig. 2*
*Fig. 3*

DEVICE FOR SEPARATING AIR FROM FLOTATION FOAM

CROSS-REFERENCE TO RELATED APPLICATIONS

The present application claims priority under 35 U.S.C. §119 of German Patent Application No. 102 14 403.6, filed on Mar. 30, 2002, the disclosure of which is expressly incorporated by reference herein in its entirety.

BACKGROUND OF THE INVENTION

1. Field of the Invention

The present invention relates to a device for the removal of air from flotation foam formed during flotation of a paper fiber containing suspension that includes a driven rotor.

2. Discussion of Background Information

The separation of air from flotation foam that accumulates during the flotation of fibrous material suspensions, e.g., in recovered paper processing, is necessary to be able to further process the flotation foam. As is known, flotation foam, which is formed during the flotation of a paper-fiber-containing suspension, is particularly hard to handle, since it is difficult to deaerate or dewater. Such a flotation foam is fluid and pumpable only to a limited extent, and tends to lodge on or adhere to the walls.

A device for the separation of air from flotation slurries is known, e.g., from German Patent No. 40 09 042 C2. This device essentially includes a hydrocyclone, which although it is well suited to the deaeration of liquids and foams, works as a hydraulic machine in the closed system, which requires a device with appropriate apparatus and presupposes at least a certain fluidity of the foam.

German Patent Application No. 35 19 374 A1 describes a mechanical foam breaker that can be plunged directly into the upper layer of foam. Such mechanical foam breakers can be used, e.g., in a foam collecting tank of a flotation unit. The foam breakers detect only the upper, strongly air-containing foam layer, draw this in and centrifuge the liquid portion away radially, whereby the drops of liquid assist secondarily in causing the surface foam bubbles to burst. Lower foam layers are not detected by this system. In the lower layers, a very heavy, wet foam is formed that is not subjected to a forced deaeration. The deaeration of this wet foam takes place only by sedimentation, which requires long dwell times. This device is relatively expensive in its design construction, the space required, and also with respect to its energy consumption.

SUMMARY OF THE INVENTION

Thus, the present invention provides a corresponding device with which air can be separated from the foam as it flows off, without great expense. According to the invention, the rotor has a shaft with a circumference on which at least one rotor blade is situated. Further, the rotor is surrounded in the area of the rotor blade by a non-rotating wall.

For its functioning, the device according to the invention makes relatively few demands with respect to the nature of the flotation foam. It can be used advantageously at the foam collecting trough of a flotation unit, particularly at its discharge aperture. There the horizontal or slightly slanted flow direction of the flotation foam is guided into an almost vertically downward flow direction. At this point the wall that surrounds the rotor of the device can be, e.g., cylindrical or slightly conical. The action of the rotor is then essentially to cause the flowing-off foam to rotate and/or to centrifuge it to the wall, so that the foam bubbles are broken and the air migrates inwards, and it can then flow off upwards. The rotor is advantageously driven so that outside, the blades reach a circumferential speed of between 4 and 12 m/s.

It is particularly advantageous for the discharge aperture to be followed by an about 1 m long vertical cylindrical dropleg, such that the rotation movement produced by the invention not only offers the advantage of a separation of air, but also prevents the deposition of foam in the dropleg. It can also be advantageous to brake the rotation movement in the dropleg with the aid of flow breakers. Since the foam deaerated with the device according to the invention can be conducted directly into a pump, it is possible to pump it directly into a further flotation unit, e.g. the secondary stage, without another intermediate container.

The present invention is directed to a device for the removal of air from flotation foam formed during the flotation of a paper-fiber-containing suspension. The device includes a driven rotor that includes a shaft and at least one rotor blade positioned on the shaft, and a non-rotating wall arranged to surround the rotor in a region of the rotor blade by a non-rotating wall.

In accordance with a feature of the invention, the wall is rotationally symmetrical. Further, the rotor can be concentric with the wall.

According to another feature of the invention, the rotor may not be concentric with the wall.

The at least one rotor blade can include a plurality of rotor blades, and a smallest distance between the rotor blades and the wall may be between 10 mm and a distance corresponding to an outside diameter of the rotor blades.

Moreover, the at least one rotor blade may include a plurality of rotor blades, and the wall can be rotationally symmetrical with a maximum diameter 1.2 to 3 times of an outside diameter of the rotor blades.

According to still another feature of the invention, the wall can be shaped as a truncated cone that widens in a discharge direction of the flotation foam. Further, an angle of the truncated cone to an axial direction can be 1° to 5°, and preferably, the angle of the truncated cone is 2°.

The shaft of the rotor can be vertically oriented. Still further, a central standpipe can be arranged leading upward to draw off air.

The device can further include a foam overflow area coupled to a discharge line, in which the wall surrounding the rotor forms an upper part the discharge line.

Further, a foam collecting area may be coupled to a discharge line, such that the wall surrounding the rotor forms an upper part of the discharge line.

Still further, a foam collecting trough can be coupled to a discharge line, so that the wall surrounding the rotor forms an upper part of the discharge line.

In accordance with a further feature of the invention, a top of the device can be open.

The wall can be arranged to extend below the rotor as a vertical cylindrical discharge line. Further, the vertical cylindrical discharge line can have a length of at least 0.5 m, and preferably the vertical cylindrical discharge line may have a length of 1 m. Further still, the vertical cylindrical discharge line can have a length at least as large as an inside diameter of the vertical cylindrical discharge line. A tangential discharge can be positioned at a bottom end of the vertical cylindrical discharge line.

According to a still further feature of the invention, flow breakers may be arranged on the vertical cylindrical discharge pipe to brake or prevent rotational flow of the foam.

Moreover, the flow breakers can be arranged to guide the rotational flow of the foam into a flow directed downwards.

In accordance with another feature of the instant invention, the rotor blades can effect both a circulation in a circumferential direction and a propulsion in an axial direction.

The at least one rotor blade may include rotor blades formed as flat sheet metal blades welded onto the shaft. The sheet metal blades can be oriented at an angle of between 3° and 45° to a center of the shaft.

According to another feature of the present invention, the at least one rotor blade may have a convex shape.

In accordance with still another feature of the invention, the at least one rotor blade can be hardened.

Still further, the wall can be hardened in a working area of the at least one rotor blade.

The present invention is directed to a process for removing air from flotation foam formed during flotation of a paper fiber containing suspension in a device including a rotor having a shaft and at least one rotor blade positioned on the shaft and a non-rotating wall surrounding the rotor at least in a region of the at least one rotor blade. The process includes rotatably driving the rotor, and supplying flotation foam into an opening at a top of the wall.

According to a feature of the invention, the rotor can be concentric with the wall.

According to another feature of the present invention, the rotor may not be concentric with the wall.

The process can further include braking or preventing rotational flow of the foam in the region of the at least one rotor blade.

In accordance with still yet another feature of the instant invention, the process can include guiding the rotational flow of the foam into a flow directed downwards.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 schematically illustrates a device mounted on a flotation cell in accordance with the present invention;

FIGS. 2 and 3 illustrate alternative arrangements of the device depicted in FIG. 1;

DETAILED DESCRIPTION OF THE PRESENT INVENTION

Figure 4:
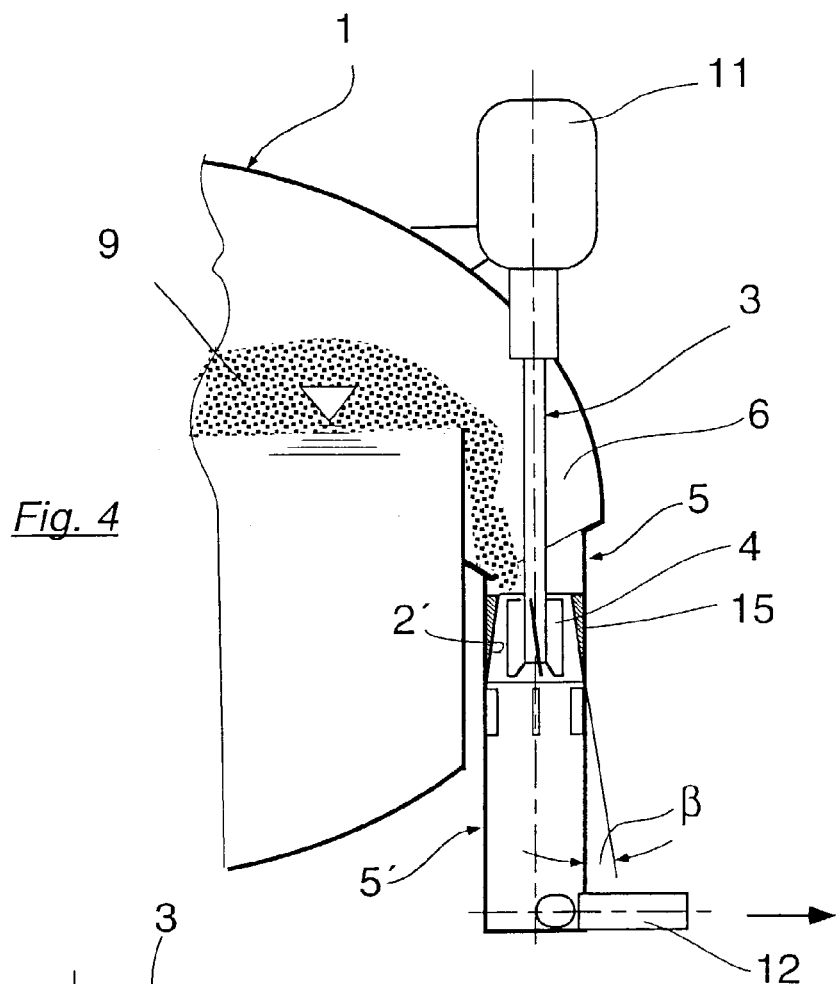
FIGS. 4 and 5 illustrates further advantageous arrangements in the area of the wall surrounding the rotor.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows a flotation device 1 in a lateral sectional view. This contains an essentially closed container that is supplied from above by a mixing device 8 with paper fiber containing suspension S to be flotated. In a manner known, per se, suspension S is mixed with air L to produce an aerated suspension S', from which the nonfibrous hydrophobic constituents rise into flotation foam 9 inside flotation device 1. Accepted stock 10, which is drawn off at the bottom of flotation device 1, contains a predominant part of the paper fibers and water.

The rotor of device 1, according to the invention, includes a shaft 3 that is provided with four rotor blades 4 and that is rotated by drive motor 11. The shape and number of rotor blades 4 can readily be optimized for a good deaerating action. It is very simple to make rotor blades 4 as flat sheet metal blades, which then, as shown here, are welded on at an angle $\alpha$ of 10° relative to the shaft axis. At the point at which rotor blades 4 are situated, the rotor is surrounded by a rotationally symmetrical concentric wall 2 that is simultaneously part of discharge line 5. While this arrangement is optimal for many cases, other arrangements are also contemplated by the inventors. Flow breakers 14, e.g., in the form of radial sheet metal strips, can be situated above a lower area 5' of the discharge line 5 and brake the rotational flow of foam 9 as it runs off. Moreover, flow breakers 14 can also be placed at an angle, so that they convert the circumferential movement into a downward flow. Discharge line 5 ends in a tangential discharge 12, and, between rotor blades 4 and tangential discharge 12, a falling zone, whose length 7 is greater than 0.5 m, and preferably at least 1 m, is located. Thus, good flow-off conditions for flotation foam 9 can be created. Instead of the tangential discharge, the discharge line 5 can also have a conical constriction at the end of the falling zone (see FIG. 2). It is advantageous for discharge line 5 to be connected at the top to the remaining part of flotation device 1 such that the air expelled by the rotor and rotor blades 4 does not escape outwardly, but can travel directly back into mixing device 8.

In many cases, accepted stock 10 is again fed to another part of flotation device 1 or another flotation device, until the cleaning has progressed to the point at which accepted stock 10 can be further processed. Frequently various parts of the flotation device are embodied as cells through which the suspension flows successively. When such cells are arranged side by side, they can have a common foam collecting trough 6 into which flotation foam 9 flows off, is collected, and is then drawn off by discharge line 5.

FIG. 2 shows a somewhat different embodiment of the foam discharge from flotation device 1. In this embodiment, flotation foam 9 is conducted from foam collecting trough 6 laterally through a channel 13. In this manner, the area of rotor blades 4 can be embodied as more easily accessible, and drive motor 11 can be attached more easily. With side-by-side foam collecting troughs 6, two such channels can also be assigned to a single deaerating device (second channel shown in dashed lines). In other embodiments, the device can be positioned directly at the foam overflow area of a flotation device, i.e., where flotation foam 9 flows off and, thus, is separated from suspension S' lying beneath it.

FIG. 3 shows an example with a flotation cell whose foam runs off downwardly in the center. The rotor is then situated at this point with wall 2 surrounding it.

The shape of wall 2 surrounding rotor blades 4 can also differ from the cylinder previously shown. In this regard, in FIG. 4 illustrates an insert 15 whose wall 2' is in the form of a truncated cone with a cross section widening in a foam discharge direction. The angle β of the cone to the axial direction can be between 1° and 5°, preferably 2°. Deaeration and discharge of flotation foam 9 are further improved by this measure.

Figure 5:
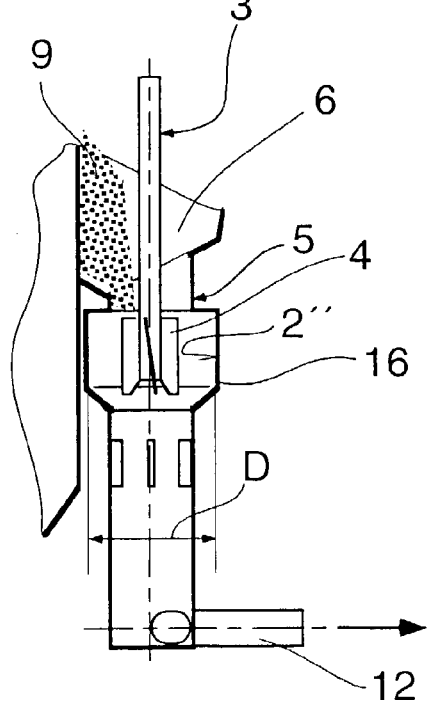

A similarly favorable effect is also provided by a centrifuge chamber 16 in the area of rotor blades 4, which is shown in FIG. 5. Thus, while wall 2" is formed as cylindrical, its greatest diameter D is 1.2 times to 3 times as large as the outside diameter of rotor blades 4.

Figure 6:
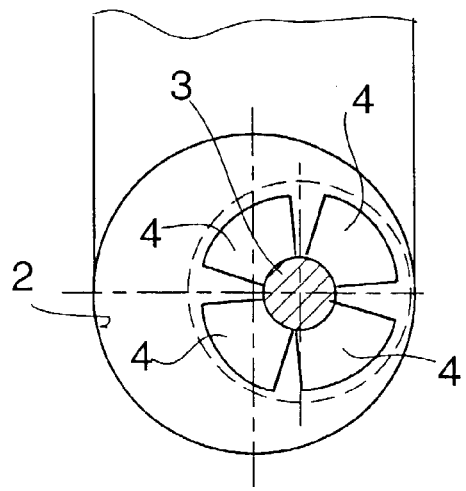
FIG. 6 illustrates a view from above of an eccentric arrangement of the rotor.

In FIG. 6, an eccentric arrangement of the rotor in discharge line 5 is shown. The rotor is placed at a point at which foam 9 flows off due to a slanting position of foam collecting trough 6 and due to the direction of rotation of the rotor.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A device for the removal of air from flotation foam formed during the flotation of a paper-fiber-containing suspension, comprising:
    a tank and a foam overflow area structured and arranged to form a wall over which the flotation foam flows into said foam overflow area;
    a driven rotor that includes a shaft and at least one rotor blade positioned on said shaft; and
    a discharge line composed of a non-rotating wall surrounding said rotor in a region of said rotor blade, said discharge line being coupled to said foam overflow area.

2. The device in accordance with claim 1, wherein said wall is rotationally symmetrical.

3. The device in accordance with claim 2, wherein said rotor is concentric with said wall.

4. A device for the removal of air from flotation foam formed during the flotation of a paper-fiber-containing suspension, comprising:
    a driven rotor that includes a shaft and at least one rotor blade positioned on said shaft, wherein said rotor is not concentric with said wall; and
    a discharge line composed of a non-rotating wall surrounding said rotor in a region of said rotor blade.

5. The device in accordance with claim 1, wherein said at least one rotor blade comprises a plurality of rotor blades, and a smallest distance between said rotor blades and said wall is between 10 mm and a distance corresponding to an outside diameter of said rotor blades.

6. The device in accordance with claim 1, wherein said at least one rotor blade comprises a plurality of rotor blades, and said wall is rotationally symmetrical with a maximum diameter 1.2 to 3 times of an outside diameter of said rotor blades.

7. The device in accordance with claim 1, wherein said wall is shaped as a truncated cone that widens in a discharge direction of the flotation foam.

8. A device for the removal of air from flotation foam formed during the flotation of a paper-fiber-containing suspension, comprising:
    a driven rotor that includes a shaft and at least one rotor blade positioned on said shaft; and
    a non-rotating wall arranged to surround said rotor in a region of said rotor blade,
    wherein said wall is shaped as a truncated cone that widens in a discharge direction of the flotation foam and an angle of said truncated cone to an axial direction is 1° to 5°.

9. The device in accordance with claim 8, wherein said angle of said truncated cone is 2°.

10. The device in accordance with claim 1, wherein said shaft of said rotor is vertically oriented.

11. The device in accordance with claim 10, further comprising a central standpipe leading upward to draw off air.

12. A device for the removal of air from flotation foam formed during the flotation of a paper-fiber-containing suspension, comprising:
    a driven rotor that includes a shaft and at least one rotor blade positioned on said shaft;
    a non-rotating wall arranged to surround said rotor in a region of said rotor blade; and
    a foam overflow area coupled to a discharge line,
    wherein said wall surrounding said rotor forms an upper part of said discharge line.

13. The device in accordance with claim 1, further comprising a foam collecting area coupled to a discharge line, wherein said wall surrounding said rotor forms an upper part of said discharge line.

14. A device for the removal of air from flotation foam formed during the flotation of a paper-fiber-containing suspension, comprising:
    a driven rotor that includes a shaft and at least one rotor blade positioned on said shaft;
    a non-rotating wall arranged to surround said rotor in a region of said rotor blade; and
    a foam collecting trough coupled to a discharge line,
    wherein said wall surrounding said rotor forms an upper part of said discharge line.

15. The device in accordance with claim 1, wherein a top of said device is open.

16. The device in accordance with claim 1, wherein said discharge line is arranged to extend below said rotor as a vertical cylindrical discharge line.

17. The device in accordance with claim 16, wherein said vertical cylindrical discharge line has a length of at least 0.5 m.

18. The device in accordance with claim 16, wherein said vertical cylindrical discharge line has a length of 1 m.

19. The device in accordance with claim 16, wherein said vertical cylindrical discharge line has a length at least as large as an inside diameter of said vertical cylindrical discharge line.

20. A device for the removal of air from flotation foam formed during the flotation of a paper-fiber-containing suspension, comprising:
    a driven rotor that includes a shaft and at least one rotor blade positioned on said shaft; and a non-rotating wall arranged to surround said rotor in a region of said rotor blade, wherein said wall is arranged to extend below said rotor as a vertical cylindrical discharge line; and a tangential discharge is positioned at a bottom end of said vertical cylindrical discharge line.

21. The device in accordance with claim 1, wherein the discharge line comprises a vertical cylindrical discharge pipe and the device further comprises flow breakers arranged on said vertical cylindrical discharge pipe to brake or prevent rotational flow of the foam.

22. The device in accordance with claim 21, wherein said flow breakers are arranged to guide the rotational flow of the foam into a flow directed downwards.

23. The device in accordance with claim 1, wherein said rotor blades effect both a circulation in a circumferential direction and a propulsion in an axial direction.

24. The device in accordance with claim 1, wherein said at least one rotor blade comprises rotor blades formed as flat sheet metal blades welded onto said shaft.

25. The device in accordance with claim 24, wherein said sheet metal blades are oriented at an angle of between 3° and 45° to a center of said shaft.

26. The device in accordance with claim 1, wherein said at least one rotor blade has a convex shape.

27. The device in accordance with claim 1, wherein said at least one rotor blade is hardened.

28. The device in accordance with claim 1, wherein said wall is hardened in a working area of said at least one rotor blade.

29. A process for removing air from flotation foam formed during flotation of a paper fiber containing suspension, in a device including a rotor having a shaft and at least one rotor blade positioned on the shaft and a non-rotating wall surrounding the rotor at least in a region of the at least one rotor blade, said process comprising:

rotatably driving the rotor; and supplying flotation foam into an opening at a top of the wall.

30. The process in accordance with claim 29, wherein said rotor is concentric with said wall.

31. The process in accordance with claim 29, wherein said rotor is not concentric with said wall.

32. The process in accordance with claim 29, further comprising braking or preventing rotational flow of the foam in the region of the at least one rotor blade.

33. The process in accordance with claim 29, further comprising guiding the rotational flow of the foam into a flow directed downwards.

* * * * *